United States Patent Office 3,265,068
Patented August 9, 1966

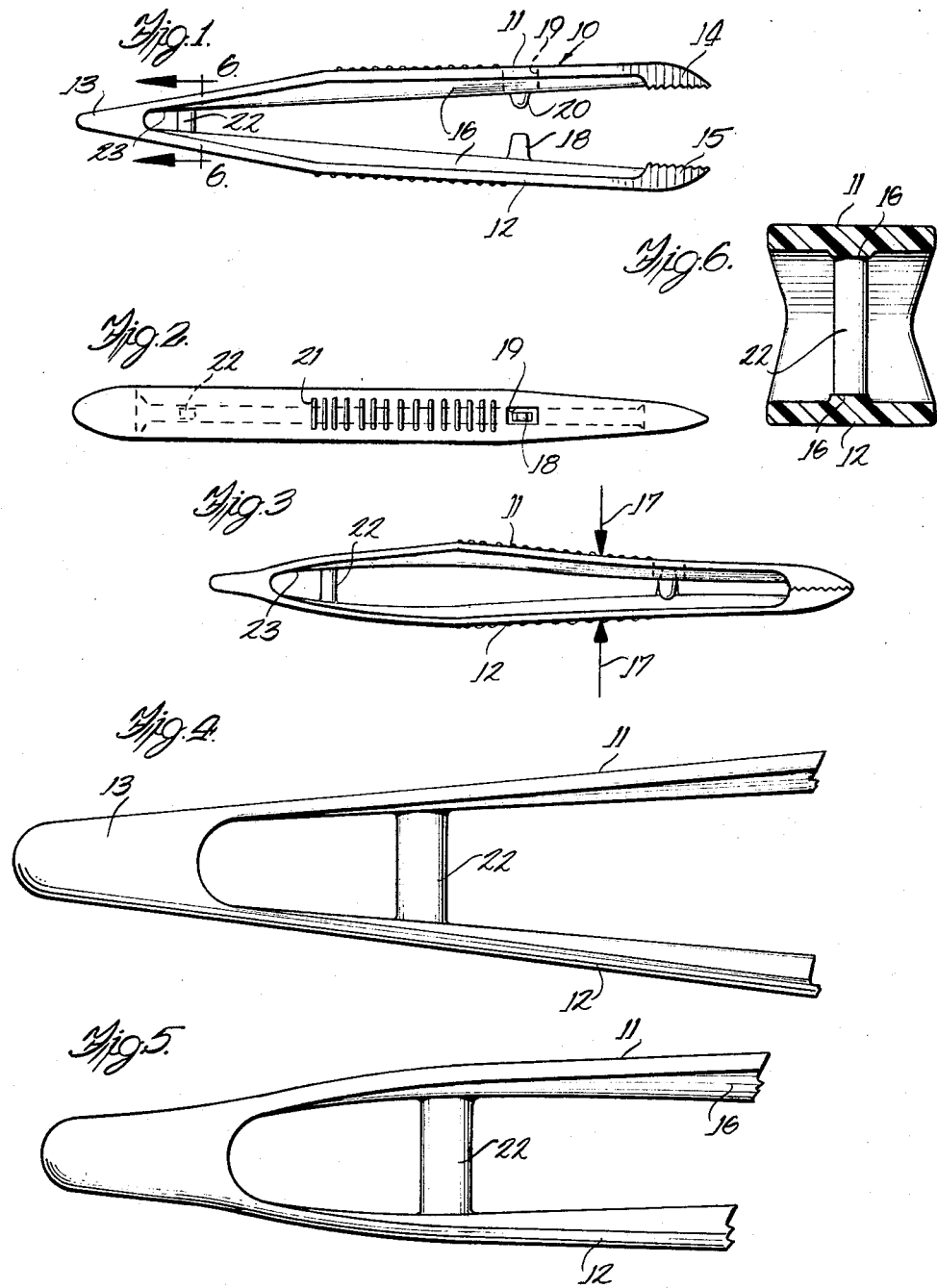

3,265,068
PLASTIC FORCEPS
Bartholomew Holohan, Mountainside, N.J., assignor to American Hospital Supply Corporation, Evanston, Ill., a corporation of Illinois
Filed Aug. 24, 1962, Ser. No. 219,213
4 Claims. (Cl. 128—321)

This invention relates to plastic forceps, and, bore specifically, to means for improving the production and operating characteristics of such forceps.

In the copending, co-owned application, Serial No. 56,886, filed September 19, 1960, now Patent No. 3,140,-715, there is disclosed a plastic forceps formed from a single piece of plastic material and having projection and socket means for guiding the jaws into proper intermeshing relation when they are together. The jaws are normally spread apart, being maintained in that condition by the springiness or resiliency of the plastic material from which the forceps are molded.

It has been found that the distance between the normally spaced jaws is difficult to control during molding because of shrinkage of the plastic as it solidifies from the fluid state. While this difficulty might be overcome by increasing the bulk of material in the arms of the forceps, the addition of such material necessarily alters the action or operating characteristics of the forceps. Specifically, the resistance of the arms to closure of the jaws becomes increasingly and undesirably dependent upon the extent of closure as the bulk of the arms is increased.

Accordingly, it is an object of the present invention to provide an improved plastic forceps having means to control the extent of closure of the jaws during manufacture without adversely affecting the operation of the final product.

Another object is to provide a pair of plastic forceps having integral means for substantially uniformly increasing the resistance to closure of the jaws without at the same time increasing the bulk of the arms thereof.

A still further object is to provide a forceps equipped with means which alters the flexing charatceristics and configuration of the arms as they are urged together to improve the operation or action of the structure as a whole.

Other objects will appear from the specification and drawings, in which:

FIGURE 1 is a side elevational view of a pair of forceps embodying the present invention;
FIGURE 2 is a top plan view of the forceps;
FIGURE 3 is a side elevational view similar to FIGURE 1 but showing the forceps with the jaws thereof fully closed;
FIGURE 4 is an enlarged broken elevational view illustrating the spanner element of the forceps when the jaws thereof are spaced apart (i.e., when the arms are not under tension);
FIGURE 5 is an enlarged elevational view similar to FIGURE 4 but illustrating the action of the spanner element when the jaws are closed (i.e., when the arms are under tension); and
FIGURE 6 is a still further enlarged view taken in section along line 6—6 of FIGURE 1.

In the embodiment of the invention illustrated in the drawings, the numeral 10 generally designates a pair of forceps having upper and lower arms 11 and 12. A pair of corresponding ends of the arms are secured together by a connecting portion 13, and the opposite ends of the arms are provided with jaws 14 and 15. Most desirably, the entire article is molded or otherwise formed from a suitable plastic material. Polystyrene has been found particularly suitable, although other materials such as cellulose acetate, polyethylene, cellulose nitrate, and other plastic materials having the desired characteristics of strength and flexibility, might also be used.

Arms 11 and 12 are generally T-shaped in section, having longitudinal ribs 16 extending centrally along their inner opposing surfaces. As shown clearly in FIGURES 1 and 3, these ribs extend substantially the full length of the arms between the jaws 14–15 and the connecting portion 13. It will be noted, however, that the rear portion of each rib tapers rearwardly and that, as a result, the stiffening effect produced by the ribs diminishes near connecting portion 13.

Normally, the integrally-formed arms diverge forwardly from connecting portion 13, so that jaws 14 and 15 are spaced substantially apart, as shown in FIGURE 1. Each of these jaws is provided with transversely-extending teeth which are staggered so that intermeshing occurs when the jaws are brought together, the intermeshing first occuring at the extreme tips of the jaws and then, as continued force is applied in the direction of the arrows 17 in FIGURE 3, the teeth are brought into intermeshing relationship over the entire opposing surfaces of the jaws.

Between jaw 15 and connecting portion 13, the longitudinal rib 16 of the lower arm is provided with an integral projection 18. Similarly, the rib of the upper arm 11 is provided with a socket 19 for receiving projection 18 when the jaws are closed. On each side of the socket are a pair of upstanding ears 20, each of which projects downwardly beneath rib 16 of arm 11 a distance corresponding substantially with the height of that rib in the vicinity of the socket. The relative dimensions of the socket opening and the projection are such that the projection passes freely into the open socket when the jaws are closed. Once it has passed into the socket, the upstanding projection or tongue 18, by engagement with depending ears 20, prevents lateral movement of the arms and lateral displacement of the jaws. If desired, the outer surfaces of the arms 11 and 12 may be provided with transverse ridges 21 so that the instrument may be firmly gripped and easily manipulated by a user.

Intermediate the opposite ends of the forceps (but spaced substantially closer to the connecting portion 13 than to jaws 14 and 15) and extending between the tapered rear portions of ribs 16, is a spanner element 22. The spanner element is formed integrally with arms 11 and 12 and, shown in FIGURE 6, is approximately the same width as, or slightly narrower than, the ribs 16. While the spanner is disposed near the connecting portion 13, it is nevertheless spaced forwardly from that portion to an extent sufficient to provide a substantial space or opening 23 therebetween.

The spanner 22 functions as a fulcrum to reverse the action of the portions of arms 11 and 12 behind the spanner, that is, between the spanner and connecting portion 13. Normally, the rear portions of the arms 11 and 12 are straight, except for the taper of ribs 16, as shown in FIGURE 4. However, as the jaws are urged together and the front portions of the arms flex inwardly towards each other, the rear portions of the arms behind spanner 22 bow outwardly away from each other (FIGURE 5). Despite the thinness of the rear portions of the arms resulting from the diminished size of the ribs 16, and the greater flexibility and relative weakness inherent in such a construction, the bending acton of each arm is distributed over the entire rear portion of that arm in the vicinity of the spanner element instead of being localized immediately adjacent the connecting portion 13. Thus, when the jaws are closed, the rear portions of arms 11 and 12 curve in gentle arcs on opposite sides of the spanner element 22.

It has been found that the spanner element produces an increase in the resistance of the arms to closure which is substantially uniform throughout the entire range of movement of the jaws. At the same time, the spanner effectively reduces the possibility of breakage or fatigue of the material of the arms by causing the rear portions of the arms to bend in gradual arcs about the spanner.

As previously indicated, the spanner element also provides an important function in maintaining the spaced jaws at pre-selected distances despite slight dimenional changes in ribs 16 and in other parts of the forceps during and immediately following a molding operation. This is accomplished without increasing the amount of plastic material in the arms and without appreciably increasing the bulk or quantity of material in the forceps as a whole.

While in the foregoing I have disclosed an embodiment of the present invention in considerable detail for purposes of illustration, it will be understood by those skilled in the art that many of these details may be varied without departing from the spirit and scope of the invention.

I claim:

1. In a pair of forceps formed from plastic material, a pair of integrally-formed flexible plastic arms connected together at one end of said forceps, said arms being provided with opposing jaws at the opposite ends thereof, and an integral plastic spanner element extending between said arms and spaced from the connected ends of said arms in close proximity thereto, said spanner element being joined to and securely interconnecting both of said arms and extending longitudinally of said arms only a relatively short distance therealong, and means provided by said arms between said spanner element and said jaws for preventing relative lateral displacement of said jaws as the same are moved between partially closed and fully closed positions.

2. In a pair of forceps formed from plastic material, a pair of integrally-formed plastic arms connected together at one end of said forceps, said arms being provided with opposing jaws at the free opposite ends thereof and also being provided with longitudinally-extending ribs along the inner opposing surfaces thereof, and an integral spanner element extending between said arms and spaced from the connected ends of said arms in close proximity thereto, said spanner element being joined to and securely interconnecting both of said arms and extending longitudinally of said arms only a relatively short distance therealong, and means provided by said arms between said spanner element and said jaws for preventing relative lateral displacement of said jaws as the same are moved between partially closed and fully closed positions.

3. The structure of claim 2 in which said ribs are tapered adjacent the connected ends of said arms, said spanner element extending between the tapered portions of said ribs and being spaced from the connection between said arms.

4. In a pair of forceps formed from plastic material, a pair of flexible plastic arms joined together at the rear end of said forceps, said arms being provided with opposing jaws at the free forward ends thereof, and a rigid spanner element extending between the rear portions of said arms at a spaced distance from the junction between said arms and in close proximity to said junction, said spanner element being joined to and securely interconnecting both of said arms and extending longitudinally of said arms only a relatively short distance therealong and means provided by said arms between said spanner element and said jaws for preventing relative lateral displacement of said jaws as the same are moved between partially closed and fully closed positions.

References Cited by the Examiner

UNITED STATES PATENTS

| | | | |
|---|---|---|---|
| 115,790 | 10/1874 | Clark | 128—354 |
| 421,925 | 2/1890 | Graves | 81—43 |
| 442,142 | 12/1890 | Schwerter | 81—43 |
| 1,071,978 | 9/1913 | White | 128—354 |
| 1,889,475 | 11/1932 | Henkel | 128—354 X |
| 2,082,062 | 6/1937 | Johnson | 128—354 |
| 2,376,135 | 5/1945 | Frasher | 81—43 X |
| 2,406,393 | 8/1946 | Neugass | 128—354 |
| 2,943,521 | 7/1960 | Betton | 81—43 |

FOREIGN PATENTS 852,440  10/1952  Germany.

RICHARD A. GAUDET, *Primary Examiner.*

JORDAN FRANKLIN, ROBERT E. MORGAN,
*Examiners.*

R. TEGTMEYER, *Assistant Examiner.*